United States Patent Office 3,552,022
Patented Jan. 5, 1971

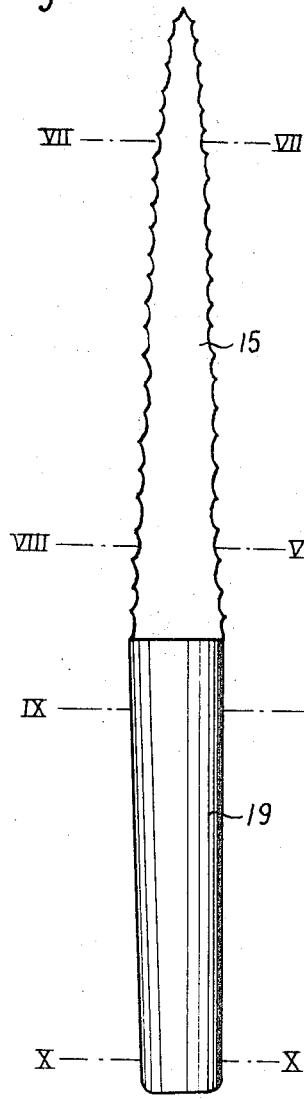
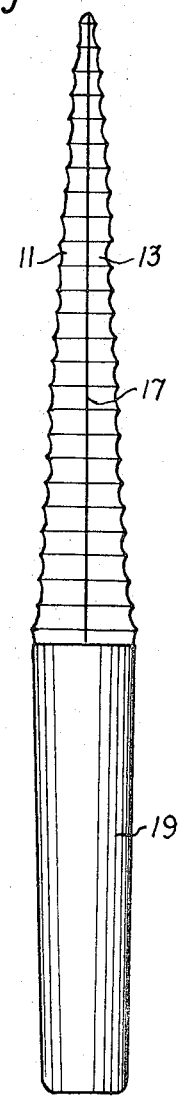
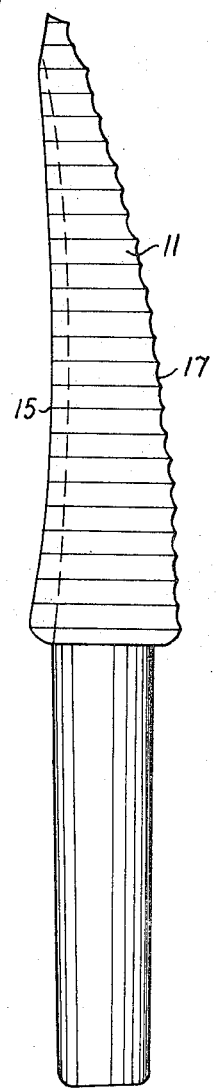
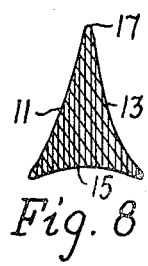

3,552,022
APPARATUS FOR CLEANING OR POLISHING OF TEETH
Per Axel Torbjörn Axelsson, Drottninggatan 27, Karlstad, Sweden
Filed July 5, 1968, Ser. No. 742,800
Int. Cl. A61c 3/06
U.S. Cl. 32—58                                             4 Claims

ABSTRACT OF THE DISCLOSURE

A dental motor-driven tool is described by means of which the approximative teeth faces at all teeth interspaces can be cleaned or polished. The tool has a conical stem portion that can easily be inserted in and removed from a handle wherein a reciprocating socket therefor is placed. The operating end of the tool is wedge-like and pointed, two broad sides being rough in order to abrade the teeth faces and the third face being narrow and smooth in order not to hurt the gums.

With usual teeth brushes it is impossible to clean the approximative teeth faces, i.e. the faces bordering the teeth interspaces, but these faces can only be reached by toothpicks, the cleaning effect of which, however, is poor.

The object of the invention is to create an apparatus enabling an improved teeth care by mechanized rubbing of said teeth faces. The essential characterising feature of said apparatus is that it comprises a pointed tool suitable for insertion into and through teeth interspaces and having opposite abrading faces set at an acute angle to each other, said tool being inserted into a socket mounted for reciprocation at the end portion of a slim elongated handle, in a direction transverse to the length direction of said handle and parallel to the length direction of the tool, said socket being free to turn so that the abrading faces of the tool adjust themselves to the teeth faces during operation.

Figure 1:
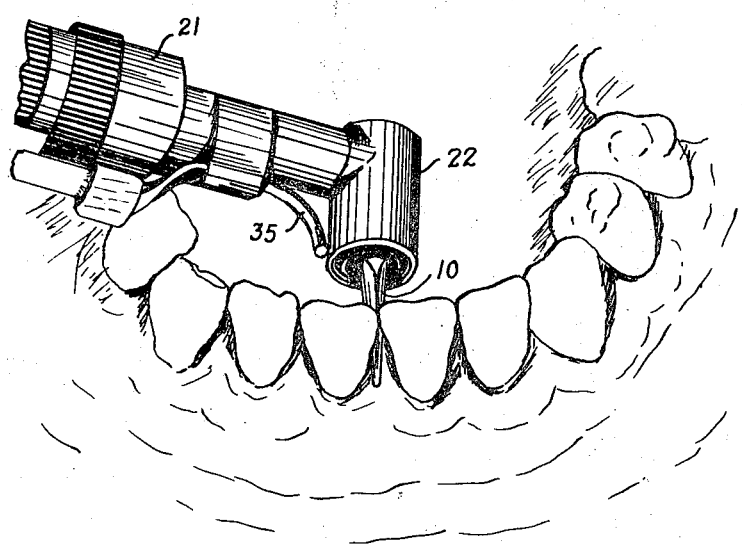
Figure 2:
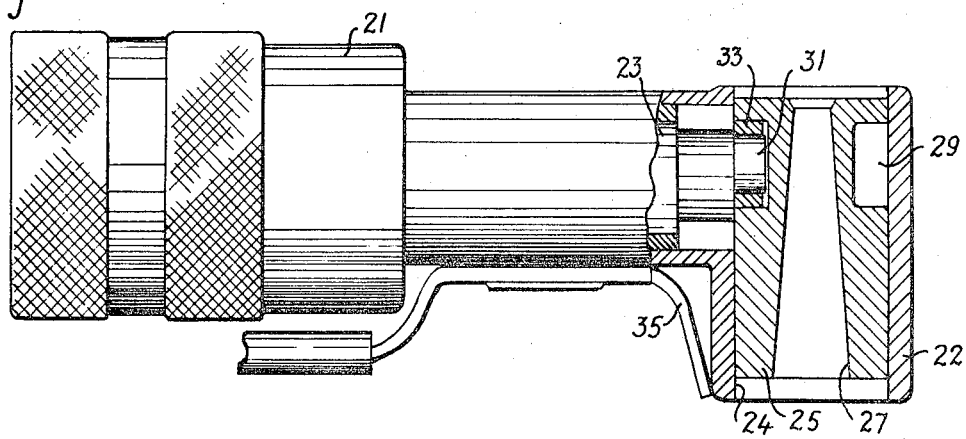
Figure 3:
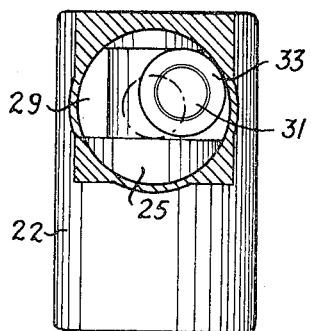

An embodiment of the apparatus will be more closely described herein below with reference to the accompanying drawings, in which FIG. 1 is a perspective view of the apparatus in operation, FIG. 2 is a side view of the apparatus with parts shown in longitudinal section and with the tool removed, FIG. 3 is a cross-sectional view, and FIGS. 4 to 9 show the tool separately on an enlarged scale, FIGS. 4, 5 and 6 being elevational views seen towards the back, the edge and one side of the tool, respectively, and FIGS. 7, 8, 9 and 10 being cross-sectional views taken along the lines VII—VII, VIII—VIII, IX—IX and X—X, respectively.

As shown in the drawings and particularly in FIGS. 4 to 10, the tool 10 is elongated, pointed and wedge-shaped, so that a longitudinal edge is formed, the tool having the general appearance of the outermost portion of a common sheath-knife. The tool has two active side faces 11, 13 set at an angle of 20 to 40 degrees to each other, and the inactive back or base face 15 which is of considerably less width than the faces 11, 13. The active faces join along an edge 17 which may be somewhat blunt. FIGS. 7 and 8 show that the cross-sectional area of the tool which has the general shape of an isosceles triangle decreases gradually in the direction towards the point of the tool, the angle of the edge simultaneously getting sharper. The side faces are adapted to perform an abrading work upon the teeth, and their surface condition or roughness is chosen accordingly. Preferably the sides are provided with grooves and ridges starting from the edge 17 and extending transversely across both side faces. Said shape is suitable for removal of coatings of bacteria, so-called dental plaque, from the teeth faces or for polishing thereof. As an alternative the working faces may be provided with projections in the shape of small bristles. The required roughness of the tool may also be provided by coating the active side thereof with particles of a material harder than the rest of the tool, e.g. grinding powder. This is suitable particularly when the tool should be used for grinding amalgam stoppings. In either case the treatment of the teeth may take place with or without the use of some polishing paste. The working faces of the tool are somewhat concave in order to fit to the convex teeth faces. The back face 15 is smooth and also concave in order not to hurt the gum papilla during the operation of the tool in a teeth interspace. The material of the tool may be plastics or rubber having a suitable hardness, or other resilient material which is not so hard as to damage the teeth but yet stiff enough to enable the tool to be pushed into and through the teeth interspace without collapsing. The length of the active part of the tool may be 10 to 14 millimeters, the maximum width 4 to 6 millimeters and the maximum thickness 1 to 3 millimeters. Sets of tools of different sizes should be kept handly to enable easy shifts according to requirement. Tools once used are usually disposed of.

The tool has a comparatively long, slightly tapering attachment end portion 19 adapted to be inserted into a corresponding socket in the apparatus to be described below, wherein it is retained by frictional engagement sufficiently great for the work but allowing easy removal by hand.

The apparatus for holding and driving the above-described tool during its operation comprises a slim generally cylindrical handle 21, the outermost part of which is shown in FIGS. 1 and 2. Said handle houses a rotary shaft 23 which is driven by a motor via a flexible connection, as in dental drills. Preferably the handle belongs to an already existing dental drilling equipment, and merely an exchangeable end portion of the handle is designed according to the invention.

The handle ends with a cylindrical sleeve 22 set at right angles thereto and extending slightly therefrom on one side only. A piston-like socket 25 fits into the cylindrical bore 24 of said sleeve 22 and is guided thereby in a rectilinear path perpendicular to the length direction of the handle 21. A central conical bore 27 in said socket is of a size suitable for inserting the root end portion 19 of the tool 10 therein and for retaining the same with frictional engagement. The shaft 21 ends with an eccentric pin 31 which protrudes past the cylindrical face 24 and into a circumferential groove 29 cut in the socket 25. A bushing 33 is inserted between the pin 31 and the flat opposite faces of the groove 29. When the shaft 23 is turned, the pin 31 reciprocates the socket 25 and the tool 10 inserted therein, in their length direction, i.e. at right angles to the length direction of the handle. The eccentricity of the pin 31 is so great that the amplitude of the stroke is of the order of 3 millimeters, and the frequency may be preferably 3,000 to 4,000 strokes per minute. The groove 29 allows the socket 25 to turn freely about its axis, which involves that the tool 10 is self-adjusting and when inserted in a teeth interspace, adapts itself thereto and takes the angular position best suited to the shape and inclination of the teeth faces to be worked upon. A spray tube 35 may be attached to the handle and serves for supplying water whereby the loosened particles are flushed away.

The size of the apparatus is so small that it enables operation in the manner shown in FIG. 1, i.e. insertion of the tool into any teeth interspace from the inner side, which requires introduction of the tool, the sleeve 22 and the adjoining end portion of the handle into the mouthcavity. When operating into the teeth interspaces from the outside, it may be necessary to introduce said parts of the apparatus between the teeth row and the cheek or the lip, which also is possible without any inconvenience to the patient.

I claim:

1. An apparatus for cleaning or polishing the interapproximative faces of teeth, comprising, in combination, a dental handpiece having a slim elongated handle and a pointed tool suitable for insertion into and through teeth interspaces and having opposite abrading faces set at an acute angle to each other, said tool comprising a stem portion, a wedge-like and pointed operating end portion integral with said stem portion and having a narrow base face and two side faces broader relative to said base face, and constituting said abrading faces, the side faces meeting along an edge extending from the point of said end portion to said stem, said side faces being rough and said base face being smooth and concave, the cross section of the operating portion of the tool having the shape of isosceles triangle of a size gradually diminishing towards the point of the tool, the base side of the sections being considerably shorter than the two other sides, a sleeve member formed at the end of said slim elongated handle and having a hollow cylindrical bore, a socket mounted in said bore for reciprocation in a direction parallel to the length direction of the tool, a groove formed circumferentially of the outer portion of said socket adjacent one end of said socket, the stem portion of said tool being detachably fastened to said socket, reciprocating means carried by said slim elongated handle for cooperation with said groove whereby said socket is free to turn completely about an axis parallel to the length direction of the tool in order to adapt the angular position of the abrading faces of the tool to approximative teeth faces; said socket, tool and handle end portion being of a size allowing introduction thereof into the mouth as well as between the teeth and the cheek and insertion of the point of the tool from any side into any teeth interspace.

2. A tool as claimed in claim 1, in which the rough faces of the tool are concave.

3. A tool as claimed in claim 1, in which the rough faces of the tool are transversely grooved or corrugated.

4. A tool as claimed in claim 1, in which the rough faces of the tool are coated with particles of a material harder than the rest of the tool.

References Cited

UNITED STATES PATENTS

| 1,125,168 | 1/1915 | Perkins | 32—50X |
| 1,840,484 | 1/1932 | Brown | 32—58UX |
| 3,241,239 | 3/1966 | Ellis | 32—58X |
| 1,711,846 | 5/1929 | Hellborn | 32—51X |

FOREIGN PATENTS

| 10,368 | 5/1895 | Switzerland | 32—58 |

ROBERT PESHOCK, Primary Examiner